United States Patent [19]
Schutte

[11] Patent Number: 6,092,138
[45] Date of Patent: Jul. 18, 2000

[54] ELECTRONIC APPARATUS HAVING A HIGH-SPEED COMMUNICATION BUS SYSTEM SUCH AS AN I²C BUS SYSTEM

[75] Inventor: Herman Schutte, Eindhoven, Netherlands

[73] Assignee: U.S. Philips Corporation, New York, N.Y.

[21] Appl. No.: 09/098,765

[22] Filed: Jun. 17, 1998

Related U.S. Application Data

[63] Continuation-in-part of application No. 09/015,882, Jan. 29, 1998, Pat. No. 6,038,623.

[30] Foreign Application Priority Data

Jan. 30, 1997 [EP] European Pat. Off. .............. 97200250

[51] Int. Cl.[7] ................................................. G06F 13/00
[52] U.S. Cl. ......................................................... 710/113
[58] Field of Search ............................ 710/29, 113, 107; 327/19, 374, 387, 398, 399, 588

[56] References Cited

U.S. PATENT DOCUMENTS

| | | | |
|---|---|---|---|
| 4,847,867 | 7/1989 | Nasu et al. | 375/36 |
| 5,341,480 | 8/1994 | Wasserman et al. | 710/107 |
| 5,363,405 | 11/1994 | Hormel | 375/219 |
| 5,559,967 | 9/1996 | Oprescu et al. | 710/105 |
| 5,629,645 | 5/1997 | Okajima et al. | 327/399 |
| 5,748,675 | 5/1998 | Hormel et al. | 375/257 |

OTHER PUBLICATIONS

"Data Handbook IC20:80C51–based 8–bit microcontrollers" issued by Philips Semiconductors in 1994, pp. 1141–1159.

*Primary Examiner*—Glenn A. Auve
*Attorney, Agent, or Firm*—Steven R. Biren

[57] ABSTRACT

An electronic apparatus contains a bus conductor, a load circuit connected to the bus conductor for pulling a potential of the bus conductor towards a quiescent level and stations interconnected by the bus conductor. At least one of the stations contains a wired logic drive circuit and an arbitration circuit connected to the wired logic drive circuit for executing an arbitration wherein the wired logic drive circuits of different ones of the stations may each pull the potential against the load circuit. The electronic apparatus comprises a detector for producing a detection signal when the at least one station wins the arbitration. In response to the detection signal the load circuit is switched to an increased current supply capability state. In the increased current supply capability state the load circuit supplies a greater current to the bus conductor than during arbitration at least at times when the potential starts changing towards the quiescent level.

17 Claims, 5 Drawing Sheets

ELECTRONIC APPARATUS HAVING A HIGH-SPEED COMMUNICATION BUS SYSTEM SUCH AS AN I²C BUS SYSTEM

CROSS REFERENCE TO RELATED APPLICATIONS

This is a continuation-in-part of application Ser. No. 09/015,882, filed Jan. 29, 1998 U.S. Pat. No. 6,038,623, which is herein incorporated by reference.

BACKGROUND OF THE INVENTION

The invention relates to an electronic apparatus comprising stations capable of communicating via a bus conductor. The invention also relates to a station for use in such an electronic apparatus.

Such an electronic apparatus is known from the commercially available I2C bus system described in the "Data Handbook IC20: 80C51-based 8-bit microcontrollers" issued by Philips Semiconductors in 1994, pages 1141–1159.

The I2C bus uses two bus conductors: a clocksignal conductor (SCL) carrying a clocksignal and a datasignal conductor (SDA) carrying a datasignal. Message transfer via the I2C bus requires the stations to participate in various operations according to a signal protocol.

In the I2C protocol a master station controls the potential of the clock signal conductor, but other stations which participate in communication can delay clockpulses. This allows the other stations to take as much time as needed for handling the data. To delay the clock pulses the stations are capable of establishing the potential of the clock signal conductor via a wired logic function. That is, the clocks signal conductor is connected to a load circuit for pulling the clock signal conductor to a quiescent potential level when none of the stations drives the clock signal conductor against the load circuit. The stations contain wired logic drive circuits for driving the potential of the clock signal conductor against the load circuit.

In the I2C bus the stations are similarly connected on a wired logic basis to the data signal conductor. In case of the data signal conductor, the wired logic is used to make it possible that different stations attempt at the same time to supply their address to the data signal conductor during arbitration; the wired logic is also used to allow different directions of communication after arbitration.

When none of the stations drives the bus conductor against the load circuit, the potential of the bus conductor changes towards the quiescent level with a speed which is determined by a current supplied to the bus conductor by the load circuit. As published in the Data Handbook IC20, in an embodiment of the I2C bus the load circuit contains a resistor which pulls the potential of the bus conductor to the quiescent level from the moment that the last station stops driving the potential of the bus conductor against the load circuit.

In addition the load circuit of this embodiment of the I2C bus contains an additional current source which starts supplying additional current to the bus conductor once the resistor has pulled the potential of the bus conductor to within a threshold of the quiescent level. The additional current speeds up the change of potential level of the bus conductor at a time when the current through the resistor decreases.

The additional current source in this embodiment is off at the moment that the last station stops driving the potential of the bus conductor against the load circuit and for a time interval thereafter. This is because the I2C bus specifies a maximum current that may be supplied to the bus conductor at any one time to pull it towards the quiescent level. This specification ensures that the bus conductor may be driven against the load circuit at any time by a wired logic drive circuit with a specified drive strength.

Although this maximum imposed on the current is unavoidable if one wants to communicate with stations satisfying the I2C standard, the maximum current specified for the I2C bus is a drawback because it limits the speed of potential level changes on the bus conductors and thereby the maximum speed of message transfer.

SUMMARY OF THE INVENTION

It is an object of the invention to increase the speed with which message transfer can occur in a communication bus transfer system.

In the electronic apparatus according to the invention the load circuit switches to an increased current supply capability state in response to detection of the completion of arbitration. In the increased current supply state the load circuit supplies a greater current to the bus conductor than during arbitration, at least at times when the potential starts changing towards the quiescent level in the absence of pulling. Thus, the maximum current specification is respected during arbitration and exceeded after completion of arbitration.

The idea behind this is that the winner of arbitration has the power to make sure that after arbitration stations that cannot handle the increased current will not attempt to drive the bus conductor. The winner can be sure of this in advance for example when it plans communicate only with stations that will not drive the bus conductor against the load circuit after arbitration or with stations that are known to have sufficient drive capability to drive the bus conductor against the load circuit in the increased current supplied state.

For example, in the I2C the bus conductor may be the clock signal conductor it may be known that the stations participating in communication after arbitration will not attempt to extend the clock signal.

In the electronic apparatus according to the invention conventional stations (which depend on the maximum current specified for the load circuit) may be combined with novel stations which are also capable of driving the bus conductor against a higher current. The conventional stations can participate in arbitration because the current satisfy the specification during arbitration. After the decision of arbitration the conventional stations may be excluded from participation in communication, at least to the extent that they cannot handle the increased current.

As a result, a novel master station that is capable of driving the potential of the bus conductor against a higher current than the maximum current can communicate at higher speed after arbitration if this master station sets up only communication in which the potential of the bus conductor does not need to be driven against the load circuit by any station that is incapable of driving the potential of the bus signal conductor against the load circuit when more than the maximum current is supplied.

The switch to the increased current supply state may be made conditional on whether or not the arbitration has been won by a station that is capable of handling the increased current and that has signalled the intention to prevent that stations will attempt to drive the bus conductor that can't handle the increased current. If this is not the case, the load circuit may be kept in the same state as during arbitration, so that the current supplied at any instant to the bus after communication is not greater than the current at corresponding instants during arbitration. In this way it is also possible to communicate with conventional stations after arbitration.

In an embodiment of the electronic apparatus according to the invention a number of stations that are capable of winning in arbitration and of driving the potential of the bus signal conductor against the load circuit in the increased current supply capability state, each contain a switchable load circuit connected to the bus conductor. One of these stations switches on its switchable load circuit when it has won arbitration and intends to communicate in a way that prevents that stations will attempt to drive the bus conductor that can't handle the increased current. Thus different switchable load circuits are switched on, depending on which station wins arbitration.

In an embodiment of the electronic apparatus according to the invention the station switches on the load circuit in the increased current supply capability state each time the station stops driving the potential of the bus conductor against the load circuit.

In another embodiment of the electronic apparatus according to the invention, after arbitration the load circuit supplies the increased circuit both when the potential of the bus conductor is driven against the load circuit and when such driving stops and when the potential starts changing towards the quiescent level. In this case, the load circuit for example permanently supplies the increased current after arbitration, except for a decrease in current due to saturation of the current when the potential of the bus conductor comes close to the quiescent level.

In an embodiment of the electronic apparatus according to the invention, the bus conductor is a clock signal conductor and the bus also contains a data signal conductor, data being transmitted via the data signal conductor, synchronized by a signal on the clock signal conductor. In this embodiment, the stations are also connected to the data signal conductor on a wired logic basis, but the load circuit connected to the data signal conductor supplies the same current to the data signal conductor at corresponding instants during and after arbitration, that is, at instants in which the load circuit connected to the clock signal conductor supplies different currents. Validation of data always occurs on the same direction of edges of the clock signal and therefore the frequency of edges on the data signal conductor only needs to be half the frequency of edges on the clock signal conductor. As a result, a gain in speed can be attained even though additional current is supplied only to the clock signal conductor.

These and other advantageous aspects of the invention will be described further using the following figures.

DESCRIPTION OF THE PREFERRED EMBODIMENTS

Figure 1:
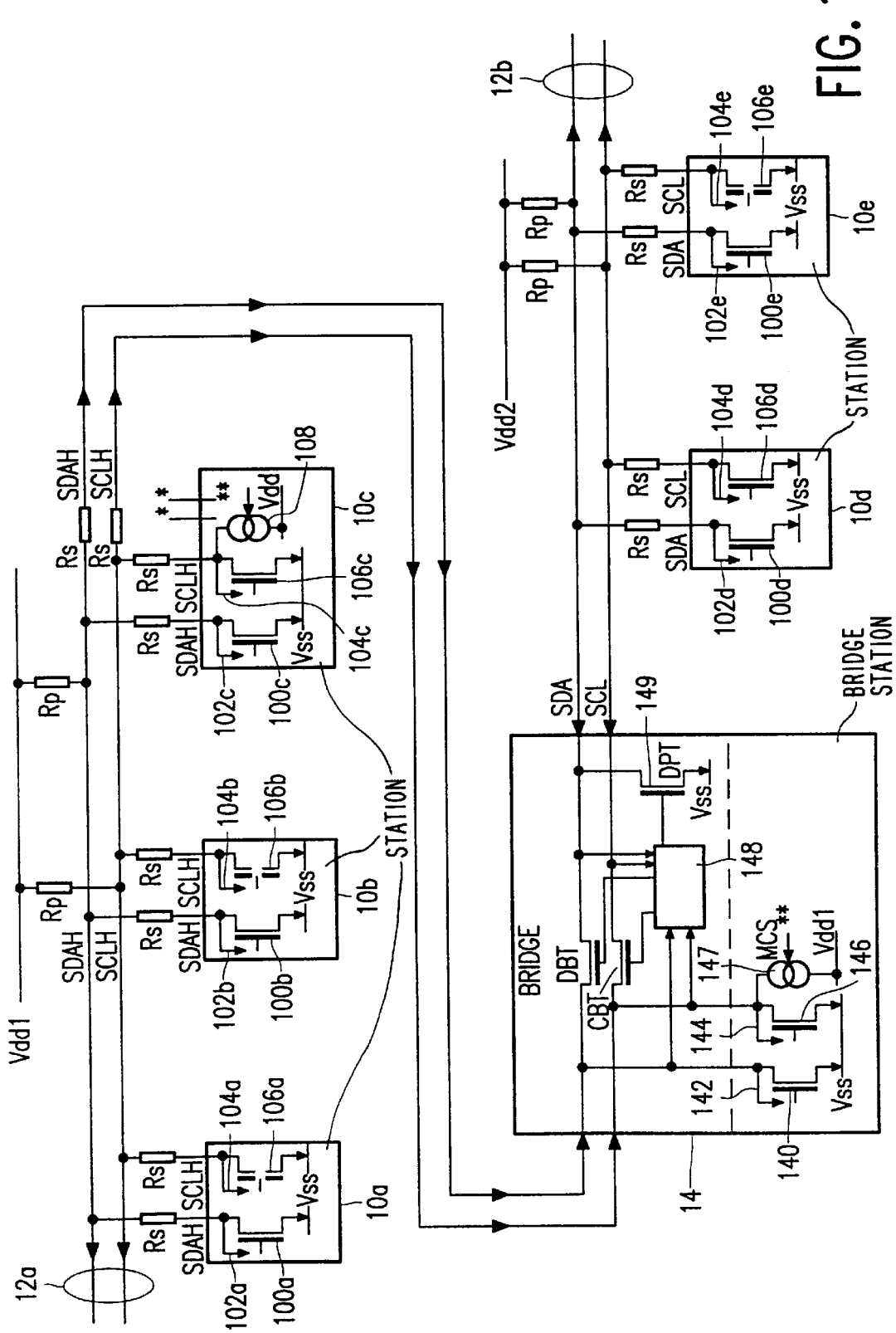
FIG. 1 shows an apparatus according to the invention.

FIG. 1 shows an apparatus according to the invention with a communication bus 12a,b containing a first and second section 12a, 12b. The apparatus contains a number of stations 10a–e connected to the communication bus 12a,b and a bridge station 14 connecting the two sections 12a,b of the communication bus. Each section of the bus 12a,b contains a clocksignal conductor SCL, SCLH and a datasignal conductor SDA, SDAH. The stations 10a–e are connected to the conductors 12a,b via resistors Rs, which serve for suppressing interfering pulses and ringing due to excessively fast signal edges.

The stations 10a–e are divided into a first and second subset 10a–c, 10d–e, corresponding to the first and second section 12a,b of the bus respectively. Each station 10a–e belonging to a subset 10a–c, 10d–e has connections to the clocksignal conductor SCL, SCLH and the datasignal conductor SDA, SDAH of the section 12a,b corresponding to that subset 10a–c, 10d–e.

In each station 10a–e the connection to the datasignal conductor SDA, SDAH has a coupling 102a–e to an input filter (not shown). In each station the connection to the datasignal conductor SDA, SDAH is coupled to a first powersupply connection Vss via the channel of a transistor 100a–e. The datasignal conductors SDA, SDAH of each section 12a,b are connected to a respective second power supply connection Vdd1, Vdd2, each conductor SDA, SDAH via an own resistor Rp.

In each station 10a–e the connection to the clocksignal conductor SCL, SCLH has a coupling 104a–e to a further input filter (not shown). In some of the stations 10c,d the connection to the clocksignal conductor SCL, SCLH is coupled to the first powersupply connection Vss via the channel of a transistor 106c,d. Such a transistor 106a,b,e is optional in the other stations 100a,b,e. The clocksignal conductors SCL, SCLH of each section 12a,b are connected to the respective second power supply connections Vdd1, Vdd2, each conductor SCL, SCLH via an own resistor Rp.

At least one of the stations 10c connected to the first section 12a contains a switchable current source 108 coupled between the clocksignal conductor SCLH of the first section 12a and the second powersupply connection Vdd1. As a switchable current source a MOS transistor (not shown) may for example be used, with its drain connected to the clocksignal conductor SCLH. Preferably this MOS transistor is made so small that no damage to the apparatus may ensue if due to an error the current source 108 supplies current at the same time as a transistor 106a–e conducts.

The bridge station 14 contains a first transistor DBT whose channel connects the datasignal conductors SDA, SDAH of the two sections 12a,b of the bus. The bridge station 14 contains a second transistor CBT whose channel connects the clocksignal conductors SCL, SCLH of the two sections 12a,b of the bus. The bridge station 14 contains a third transistor DPT 149 whose channel connects the datasignal conductor SDA of the second section 12b of the bus 12a,b to the first power supply connection Vss. The bridge station 14 contains a control circuit 148 which receives input signals from the datasignal conductors SDA, SDAH and the clocksignal conductors SCL, SCLH of both sections 12a,b of the bus. The control circuit 148 has outputs coupled to the control electrodes of the first, second and third transistors DBT, CBT, 149 respectively.

Furthermore, like the first subset of the stations 10a–c, the bridge station 14 contains a coupling 142 from the datasignal conductor SDAH and the clocksignal conductor SCLH of the first section 12a to an input filter (not shown) and a further input filter (not shown) respectively. The bridge station 14 also contains transistors 140, 146 whose channels couple the datasignal conductor SDAH and the clocksignal conductor SCLH of the first section 12a to the first power-supply connection Vss. The bridge station 14 furthermore contains a switchable current source 147 coupled between the clocksignal conductor SCLH of the first section 12a and the second powersupply connection Vdd1.

In operation the apparatus can function in a first and second mode. In the first mode, the apparatus functions entirely according to the conventional I2C protocol. In the first mode the control circuit 148 in the bridge station 14 drives the control electrodes of the first and second transistor CBT and DBT to the potential level of the lowest of the two second supply voltages Vdd1, Vdd2, so that these first and second transistors CBT, DBT will pass signals from the first section 12a of the bus to the second section 12b and vice versa. When the potential of a conductor SCL, SCLH, SDA, SDAH in one section 12a, 12b is pulled to the first power supply potential, the potential of the corresponding conductor SCL, SCLH, SDA, SDAH on the other section 12a,b will also be pulled low.

Otherwise, the potential of the conductors will be pulled up to the potential of the relevant second power supply connection Vdd1, Vdd2 via the resistors Rp. In principle, the bridge station 14 leaves the transistors 140, 144, 149 connecting the bus to the first power supply connection Vss and the switchable current source 148 unconductive in the first mode (unless the bridge station participates in the I2C protocol as a normal station).

The second supply potential Vdd1, Vdd2 are for example 3.3V and 5V above the first supply connection Vss. Other second power supply potentials Vdd1, Vdd2 may also be used. This allows the sections of the bus 12a,b to operate with different power supplies.

Thus, the first and second transistor CBT and DBT serve the dual purpose of providing a voltage level shift between the two sections of the bus 12a,b, allowing the use of subsets of stations 10a–e that operate with different supply voltages, and of isolating the two sections when high speed message transfer takes place in the first section. Preferably, the second supply potential Vdd1 of the first section 12a (which is capable of high speed message transfer) is lower than that of the second section 12b. Amongst others, this will counteract the effect of increased power consumption due to the higher frequency. However, the potentials Vdd1, Vdd2 may also be taken equal to each other. In this case the first and second transistor CBT and DBT function only as switches connecting or disconnecting the two sections 12a,b of the bus.

In the first mode the stations 10a–e may communicate with each other using the I2C protocol. This protocol is described in the "Data Handbook IC20: 80C51-based 8-bit microcontrollers" issued by Philips Semiconductors in 1994, pages 1141–1159. Briefly, the protocol starts from a quiet state of the bus, in which all conductors SDA, SDAH, SCL, SCLH are at the potential of the relevant second power supply Vdd1, Vdd2. A station (e.g. 10c) which wants to start communication generates a start condition by pulling the potential of the datasignal conductors SDA, SDAH to the first power supply potential Vss (by making the channel of transistor 100c conductive). The potential of the clocksignal conductor SCL, SCLH is left at the second power supply potential level Vdd1, Vdd2 (by leaving the channel of transistor 106c unconductive). This combination of signals on the conductors SDA, SDAH, SCL, SCLH is called a start condition. Subsequently, the station 10c attempts to generate a series of clocksignal pulses and datasignal levels, by either making the transistors 100c, 106c connecting the bus to the first power supply Vss conductive or unconductive. Data is validated by allowing the clocksignal conductors SCL, SCLH to be pulled toward the second power supply potential Vdd1, Vdd2. Other stations 10a–e can delay clockpulses by keeping the clocksignal conductor pulled toward the first power supply potential Vss (using the transistors 106a–c connecting the clock signal conductors SCL, SCLH to the first power supply connection Vss). This allows the other stations 10a–e to take as much time as needed for handling the data.

The station 10c wanting to start communication (called the "master station") supplies a header as data to the bus 12a,b, followed by an address of a "slave" station 10a–e with which it wishes to communicate, and a bit (read/write bit) of data indicating whether the master station or the slave station is to write data to the bus. Each station 10a–e receives the datasignal and clocksignal from the bus 12a,b via its input filters (not shown) which remove noise, like spikes. Each station 10a–e determines if the received signals contain its address and whether read or write is needed and starts participating in communication accordingly.

Subsequently either the master station 10c or the slave station 10a–e supplies data to the bus 12a,b. After this exchange of data the master station 10c may issue a renewed start condition followed by another address of a slave station 10a–e with a read/write bit to exchange data with another slave station 10a–e.

Finally, the master station generates a so-called "stop-condition" by allowing the potential of the datasignal conductors SDA, SDAH to be pulled from the first power supply potential Vss to the second power supply potential Vdd1, Vdd2 at a time when the potential of the clock signal conductors SCL, SCLH is left at the second power supply potential level Vdd1, Vdd2.

In the I2C protocol data is transferred in units of 8 successive bits. Each unit is followed by an acknowledge bit in which a station 10a–e receiving the data may acknowledge reception by pulling the potential of the datasignal conductor SDA, SDAH towards the first power supply potential and then allowing the potential of the clock signal conductors SCL, SCLH to be pulled toward the second power supply potential Vdd1, Vdd2. In case the receiving station 100a–e has missed the unit, or was unable to handle it, the receiving station allows the potential of the datasignal conductors SDA, SDAH to be kept pulled toward the second power supply Vdd1, Vdd2 during the clocksignal pulse for the acknowledge bit. In response, the station 100a–e transmitting the unit will for example retry transmission or break-off transmission.

More than one station 10a–e may attempt to become master station by generating a start condition and subsequent data. If such a station 10a–e notes that the bus 12a,b is busy (start condition has been transmitted and following no stop condition has yet been transmitted) it will wait until the bus 12a,b is quiet.

This leaves the possibility that two stations 10a–e generate a start condition at substantially the same time. To solve this problem the stations 10a–e monitor the potential of the datasignal conductor SDA, SDAH. If this potential is pulled towards the first power supply potential Vss during any clock pulse (except acknowledge) at a time when the station 10a–e had left its transistor 106a–c unconductive in order to allow the potential of the datasignal conductor to be pulled towards the second power supply potential Vdd1, Vdd2, the station 10a–e concludes that another station 10a–e also attempts to become master station and ceases transmission until after the next stop condition (unless of course if it is addressed). This process is called arbitration, and a station 10*a–e* ceasing transmission is said to have lost arbitration.

In the second mode of operation ("the high speed mode") use is made of the switchable current sources 108, 147 to actively increase the speed with which the potential of the clock signal conductor SCLH of the first section 12*a* is pulled towards the second power supply connection Vdd1. The station wins arbitration detects that it has won and switches to the high speed mode once it has detected that it has won. In the high speed mode the current source 108, 147 of the station that has won arbitration may be kept on during the entire time interval when the apparatus is in the second mode, that is, both when that station pulls the potential of the clock signal conductor SCLH to Vss and when that station does not pull the potential of the clock signal conductor SCLH towards VSS. As an alternative to the use of individual current sources 108, 147, the current sources 108, 147 may be replaced by a central current source shared by all stations, which is switched on by a separate detector (which is able to perform detection of completion of arbitration) when arbitration is complete.

Alternatively, and preferably, the current source 108, 147 of the station is switched off during the second mode each time when the station pulls the potential of the clock signal conductor SCLH towards Vss. Thus current consumption is reduced. This forms a push-pull stage in which both for generating rising edges in the clocksignal and for generating falling edges a device like a transistor is actively switched on, only to be switched off again before the following opposite edge. This is in contrast to the wired logic drive in the first mode, in which only one edge of the clock signal is generated actively, the other edge being caused by charging through the resistor Rp if no other station drives the clock-signals conductor SCL.

In the first mode, the frequency of the clocksignal is typically below 400 kbit/sec and in the second mode, the frequency of the clocksignal may rise to 3.4 Mbit/sec, i.e. well above 400 kbit/sec and usually above 1 Mbit/sec.

Figure 2:
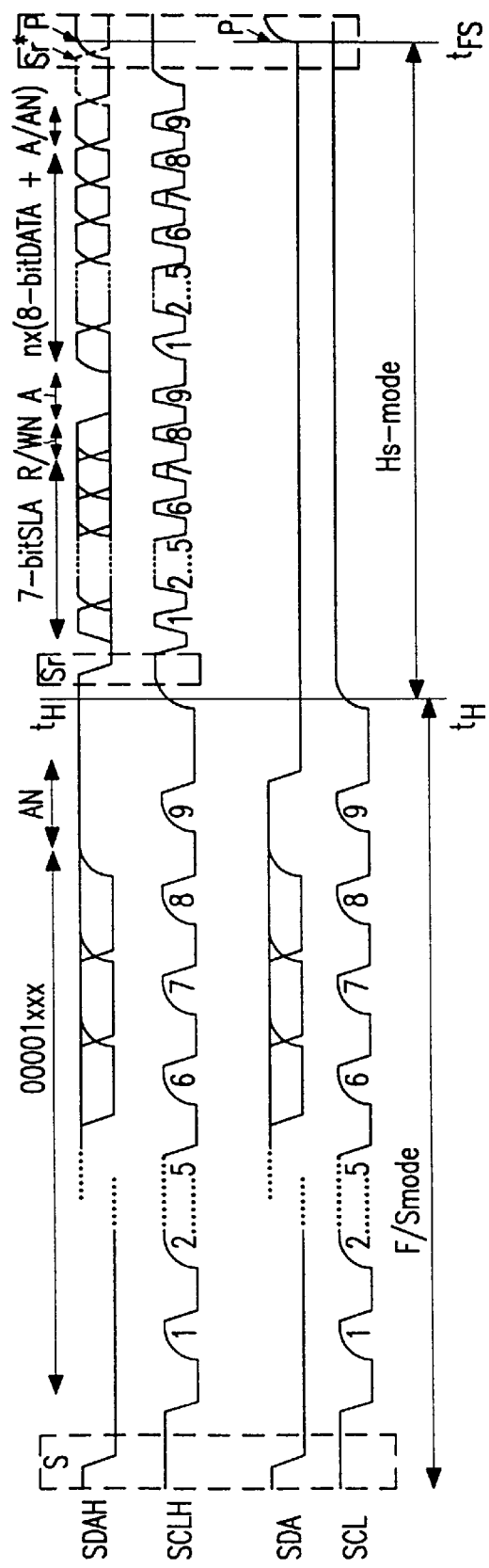
FIG. 2 shows a signal diagram of message transfer.

FIG. 2 shows a signal diagram of message transfer using the second, high speed mode. Until a time tH message transfer starts in the first mode (conventional I2C) with a start condition S followed by header bits 1–9 using the conductors SDA, SDAH, SCL, SCLH of both sections of the bus 12*a,b*. Arbitration takes place during transmission of the header in the first mode, which thus serves as an arbitration mode. The arbitration is used to ensure that a station 10*a–e* wishing to exchange information in high speed mode can be sure that it has either lost arbitration or that all other stations 10*a–e* have detected that they have lost arbitration. This is achieved by assigning a unique header to each station in the apparatus that can transmit in high speed mode (i.e. the unique header is different for each such station). These unique headers have a "lower" value than any header used for conventional I2C message transfer (lower in the sense that a station 10*a–e* putting a header used for conventional I2C message transfer on the bus 12*a*,b will always lose arbitration against a station 10*a–e* putting its unique header on the bus 12*a,b*).

The unique headers are for example in the range 0001xxx (in order of transmission, 0 indicating that the datasignal conductors SDA, SDAH are pulled toward the first power supply potential Vss by the transistor 100*a–e* connecting the datasignal conductor SDA, SDAH to the first power supply connection, 1 indicating keeping that transistor 100*a–e* unconductive, "x" indicating a state of that transistor 100*a–e* specific to the unique code of a particular station). Normal I2C headers have at least one "1" bit in the first four bits. This selection of unique headers allows an additional range of headers 00000xxx, whose use by a station 10*a–e* allows guaranteed arbitration victory over the unique headers for special purposes such as a so-called general signal known from I2C.

A station 10*a–e* has the option to use either a conventional I2C header, if it does not want to communicate in high speed mode, for example because it is known that the communication partner is not capable of working in that high speed mode, or its unique header if it wants to use the high speed mode. Transmission of the header in the first mode (conventional I2C) allows all stations to participate in arbitration. The header is optionally followed by an acknowledge bit, which should not be acknowledged.

If the station e.g. 10*c* wishing to communicate in the second high speed mode becomes master station by winning arbitration it switches to the high speed mode at a time tH. After that time tH the master station enters into a data transfer mode. In this mode the master station 10*c* transmits a renewed start condition Sr followed by an address of a slave station (bits 1–7) and a read/write bit (8). The address may be extended as defined for the I2C bus. This is followed by an acknowledge bit and a number of data units, each with its own acknowledge bit. In the second, high speed or data transfer mode the master station normally generates the rising edges of the clocksignal by making the transistor 100*c* connecting the clocksignal conductor SCLH to the first power supply connection Vss unconductive, and activating the switchable current source 108 to supply current to the clocksignal conductor SCLH. This is indicated in FIG. 2 by using straight rising edges, instead of exponentially sloping rising edges which are shown in case the switchable current source is not activated and the rising edges are cause by the resistor Rs.

Optionally, the master station 10*c* leaves the switchable current source 108 inactive at the rising edge of the clocksignal on the clocksignal conductor SCLH for each first bit of a data unit. In this case, the potential of the clocksignal conductor SCLH is left to rise due to charging via the resistor Rs connected to the second power supply connection Vdd1. This allows a slave station 10*a–b* participating in communication with the master station 10*c* to delay the rising edge of the clocksignal by keeping its transistor 106*a–b* connecting the clocksignal conductor SCLH to the first power supply connection Vss conductive. The master station resumes generation of the clocksignal pulses only after the potential of the clocksignal conductor SCLH has risen. Thus a slave station 10*a–b* may delay transmission of the next data unit until it is ready to handle that data unit.

After completing exchange of data with one slave station 10*a–b*, the master station 10*c* may generate a renewed start condition Sr* (indicated by a dashed line), followed by the address of a new slave station and a new read/write bit for a further exchange of data. This may be repeated any number of times. Instead of the renewed start condition Sr* the master station may generate a stop condition P indicating completion of message transfer and readiness for renewed arbitration. This ends the second, high speed mode and a return to the first conventional I2C mode at a time tFS.

The bridge station 14 isolates the second section of the bus 12*b* from the first section 12*a* during the second, high speed mode. For this purpose the control circuit 148 monitors transmission on the bus 12*a,b*.

Figure 3:
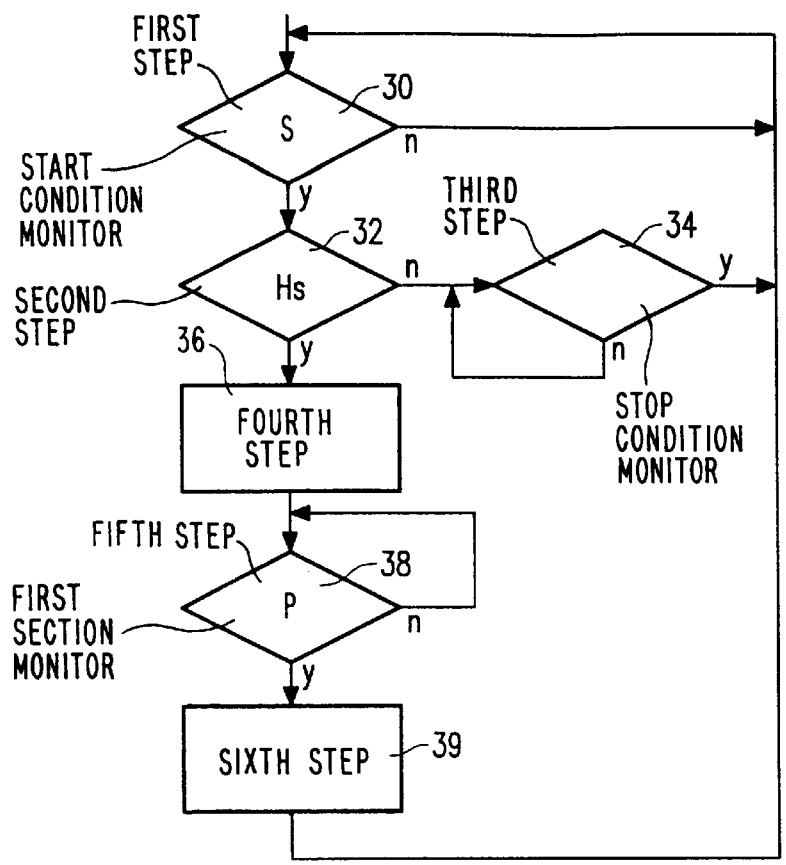
FIG. 3 shows a flow chart of operation of a control circuit.

FIG. 3 shows a flow chart of operation of the control circuit 148. Initially, the control circuit 148 supplies the lowest of the two second supply potentials Vdd1, Vdd2 to the control electrodes of the first and second transistor CBT, DBT so as to allow these transistors CBT, DBT to pass datasignals and clocksignal from one section of the bus 12a,b to the other and vice versa. The control circuit 148 supplies the third transistor DPT with the first supply potential Vss, to keep it unconductive. In this state, the control circuit 148 monitors the bus for a start condition. This is represented by step 30 of the flow chart. This continues until the control circuit 148 detects a start condition. The control circuit 148 then executes a second step, in which it determines from the header of the message following the start condition whether transmission in the second, high speed mode will take place. This is done by determining whether the header matches any one of the unique headers assigned to stations 10a–c capable of transmitting in high speed mode. Preferably these unique headers form an uninterrupted range. In this case the control circuit 148 does not need to store each individual unique header.

If the header does not match any of the unique headers no transmission in the high speed mode will take place, and the control circuit will execute a third step 34 in which the control circuit monitors the bus for a stop condition. Upon this stop condition the control circuit returns to the first step.

If the header does match any of the unique headers transmission in the high speed mode will take place, and the control circuit will execute a fourth step 36. In this step the control circuit 148 brings the potential of the control electrode of the first transistor DBT which connects the datasignal conductors SDA, SDAH of the two sections to the first power supply level Vss, so as to make the first transistor DBT unconductive. The control circuit 148 supplies one of the second power supply potentials to the third transistor DPT, so as to make the third transistor DPT conductive, connecting the datasignal conductor SDA of the second section 12b to the first power supply potential. Then the control circuit 148 waits until the potential of the clocksignal conductors SCL, SCLH rises prior to the renewed start condition Sr after the header and the optional acknowledge bit (at which time it is certain that all stations have accepted the arbitration result) and thereupon the control circuit 148 supplies the first power supply potential Vss to the control electrode of the second transistor CBT which is connected between the clocksignal conductors SCL, SCLH of the two sections 12a,b of the bus. This isolates the clocksignal conductors SCL, SCLH of the two sections 12a,b of the bus.

Next, the control circuit 148 executes a fifth step 38 of the flow chart in which the control circuit 148 monitors the first section of the bus for a stop condition. In response to that stop condition, the control circuit 148 executes a sixth step 39, making the third transistor DPT unconductive in the sixth step 39. This causes the potential of the datasignal conductor SDA of the second section of the bus to rise, creating a stop condition also on the second section of the bus. The control circuit 148 then makes the first transistor DBT conductive by supplying the lowest of the two second supply potentials Vdd1, Vdd2 to its control electrode. The control electrode of the second transistor SCL is also supplied with the lowest of the two second power supply potentials Vdd1, Vdd2. After the sixth step 39 the control circuit 148 returns to the first step 30 of the flowchart.

In this way, the signals on the second section of the bus 12b simulate the state of an I2C bus after arbitration, but without any data, followed by a stop condition when message transmission on the first section of the bus 12a is completed. Thus the stations 10d–e receiving the datasignal and clocksignal from the second section of the bus 12b are not exposed to the high frequency signals from the first section 12a, but to a quiet but busy bus which does not allow these stations 10d,e to attempt to start a new message until the message on the first section of the bus is completed.

In principle, the bridge station 14 could also supply signals to the second section of the bus 12b to exchange its own data via that second section 12b during the time that the message is exchanged over the first section of the bus 12b; the bridge station might even allow arbitration to take place on the second section during that time. But in that case, the bridge station 14 must ensure that both sections individually return to a state following or immediately preceding a stop condition before reestablishing contact between the sections 12a,b.

Optionally, the control circuit 148 may also monitor the second section of the bus 12b. This is advantageous for making it possible to break hang-ups in which the message on the first section of the bus is never completed or the connection between the busses is not reestablished due to an error. A station 10d–e connected to the second section of the bus 12b may perform a watchdog function to detect such a hang-up: if a stop condition is not detected within a predetermined watchdog time-interval after a start condition, a station connected to the second section of the bus 12b may generate break-up signal, by pulling down the potential of the clocksignal conductor SCL of the second section of the bus 12b a number of times (once or more). The control circuit 148 optionally detects the resulting dip or dips in the potential of the clocksignal conductor SCL of the second section of the bus 12b and in response returns to the initial state (step 30) in which the control circuit 148 supplies the lowest of the two second supply potentials Vdd1, Vdd2 to the control electrodes of the first and second transistor CBT, DBT so as to allow these transistors CBT, DBT to pass datasignals and clocksignals from one section of the bus 12a,b to the other and vice versa. In response to detection of the dip or dips the control circuit 148 also supplies the third transistor DPT with the first supply potential Vss, to keep it unconductive. This allows stations 10d–e to force signals (e.g. a stop condition) on both sections of the bus 12a,b in order to reset any station that is involved in the hang-up.

In FIG. 1 the bridge station has been provided also with a normal interface to the first section of the bus 12a, like any another station e.g. 10c. This allows the bridge station 14 to function also as a normal station 10a–c. Each of the stations 10a–e may be included in a separate IC package. In this case the function of bridge station and normal station may be combined in a single IC package, which needs four pins (SDA, SDAH, SCL, SCLH) for connection to the bus 12a,b. The use of these pins may be made programmable, so that upon suitable programming the pins SDA, SCL used for connection to the second section 12b can also be used for other purposes if the IC package is not used as a bridge station. This is the case for one of the stations 10c in which two pins marked by a * are used for these other purposes (if any), but could also serve for as bus connections SDA, SDAH.

Of course when only stations capable of handling the second, high speed mode are present in the apparatus, no bridge function is necessary at all and the second section of the bus 12b may be omitted; in this case the connections for the second section 12b of the bus may be used for other purposes as well.

As shown in FIG. 1, no switchable current source is used for the datasignal conductor SDAH of the first section 12a, but instead a pull-up resistor Rp is used to pull-up the potential of this conductor. This can be combined with a fast clocksignal 30 generated with a switchable current source 108, because the datasignal needs to have only half the frequency of the clocksignal. Of course for higher speed a switchable current source may be used for the datasignal as well, just as for the clocksignal. This switchable current source may be kept on during the entire time interval when the apparatus in the high speed mode, i.e. both when the potential of the data signal conductor SDAH is pulled toward the potential of the power supply VSS and when the potential of the data signal conductor is not pulled towards Vss (with the optional exception of the time interval for an acknowledge bit). Alternatively, the current source may be switched off each time the potential of the data signal conductor is pulled to Vss. However, this requires more accurate timing to avoid drive conflicts when data can be supplied by another station than the station which contains the active current source.

In case all of the stations are capable of receiving high speed signals via the busses without producing errors, the bridge station may be omitted.

Figure 4:
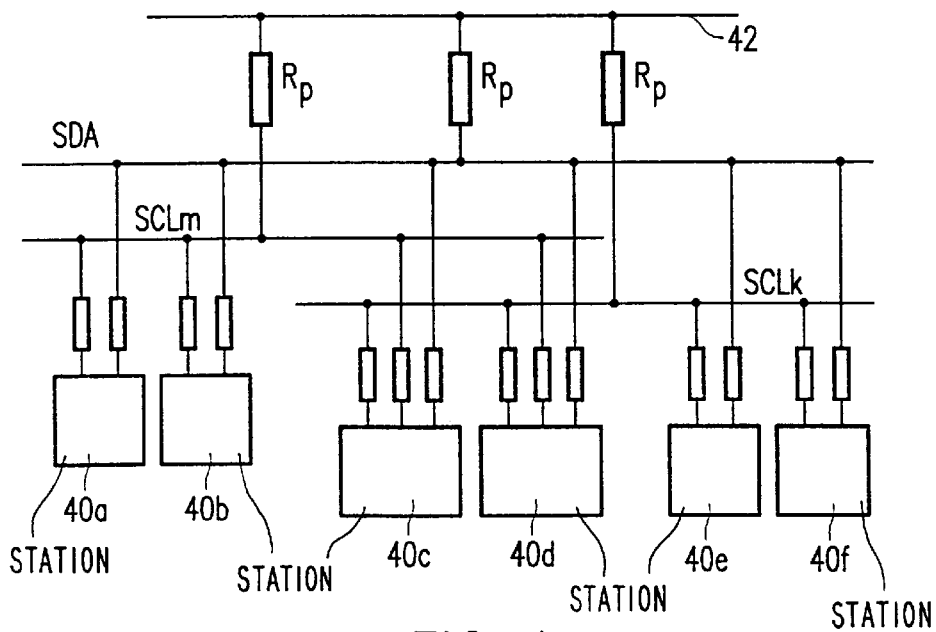
FIG. 4 shows an apparatus according to an alternative embodiment of the invention.

FIG. 4 shows an apparatus according to an alternative embodiment of the invention. This apparatus contains a number of stations 40a–f. The stations 40a–f are connected via a communication bus which contains two sections containing respective clock signal conductors SCLm and SCLk. A datasignal conductor SDA is shared by the sections. Furthermore, the apparatus contains a supply conductor 42 for a supply voltage Vdd. The supply conductor 42 is coupled to the datasignal conductor SDA and the two clock signal conductors SCLk, SCLm each via a respective resistor Rp. Two of the stations 40a,b are shown to be connected to the datasignal conductor SDA and one of the clock signal conductors SCLm. Two other stations 40c,f are shown to be connected to the datasignal conductor SDA and the other one of the clock signal conductors SCLk. The remaining stations 40c,d are shown to be connected to the datasignal conductor and both the clock signal conductors SCLm and SCLk. By way of example, the apparatus may contain a printed circuit board, on which the datasignal conductor SDA and the two clock signal conductors SCLm, SCLk are realized as conductor tracks, the stations 40a–f each corresponding to an individual integrated circuit mounted on the printed circuit board and electrically connected to the datasignal conductor SDA and one or more of the clock signal conductors SCLm, SCLk.

In operation, information is transferred between the stations via the bus SDA, SCLk, SCLm. The information transfer is performed according to an extension of the I2C bus specification described in the Philips Databook IC12a for a bus consisting of datasignal conductor SDA and one clock signal conductor SCL. During information transfer, a bit of information is put on the datasignal conductor SDA, and its validity is signalled by making the potential of a relevant clock signal conductor SCLk, SCLm high. In preparation of a next bit of information, the potential of the clock signal conductor SCLk, SCLm is made low again. Subsequently the process repeats itself with the next bit. Information transfer may be performed with a slow speed (for example with a clock frequency of 100 k to 400 k clock pulses per second), in which case the clock signal is provided at least via the first clock signal conductor SCLk. Information may also be provided at a high speed (for example 4M clock pulses per second) in which case the clock signal is provided via the second clock signal conductor SCLm but not via the first clock signal conductor SCLm. Stations 40c,d which cannot operate at the high clock speed are thus not exposed to a high speed clock signal.

At the end of the message the master station (e.g. 40c,d) that has control of the bus signals termination of the message using at least the first clock signal conductor SCLk (and the second clock signal conductor SCLm in case not all of the stations are connected to the first clock signal conductor SCLk). Thus all stations, i.e. also stations 40e,f which cannot operate at the high clock speed, can detect the end of the message even when the information content of that message itself is transmitted using a high clock speed.

Figure 5:
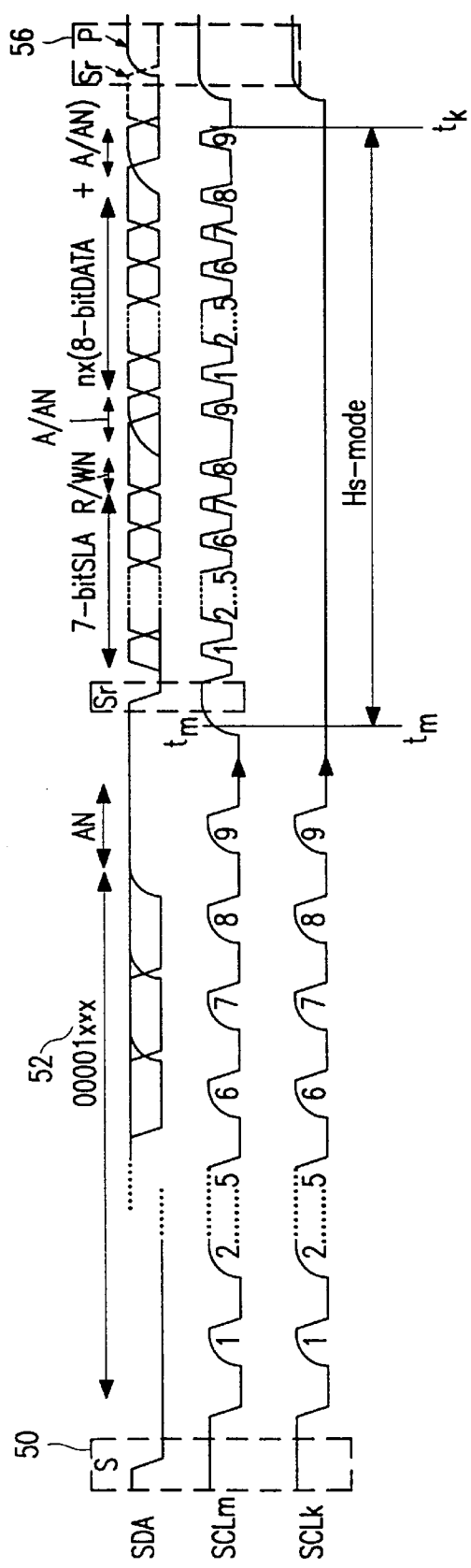
FIG. 5 shows a signal of an embodiment of message transfer.

FIG. 5 shows a timing diagram of an embodiment of message exchange via the bus SDA, SCLm, SCLk. Message exchange starts with a time interval in which a start signal 50 of the message 30 transmitted, and if necessary signals 52 for arbitration between potentially different master stations. The start signal 50 is intended for all stations 40a–f and is therefore transmitted at least using the first clock signal conductor SCLk and in case some stations 40e,f are connected only to the second clock signal conductor SCLm also via that clock signal conductor SCLm.

As start signal a so-called "start condition" 50 is used, is a level transition of the potential of the datasignal conductor SDA caused by a master station (e.g. 40c,d) while the potentials of the two clock signal conductors SCLm, SCLk are both high, that is, at the level which ordinarily signals that the datasignal conductor SDA carries valid data high (or at least when the potentials of the first clock signal conductors SCLk is high in case that clock signal conductor is connected to all stations 40a–f). The master station (e.g. 40c,d) which starts the message causes the level transition by providing a low impedance path between a low potential power supply terminal and the clock signal conductors SCLm, SCLk.

The start condition is the beginning of an arbitration process. The start condition is detected by the other stations. As a result of detection any other master stations (e.g. 40c–d) that have not sent a start condition will refrain from starting messages until a stop condition (to be described later) is detected. The master station that transmits a start condition cannot be sure that it is the only master station (e.g. 40c,d) requesting control of the bus, because it is impossible to detect whether another master station (e.g. 40c, d) has transmitted a start condition more or less simultaneously.

The arbitration process is continued by transmission of a code 52 comprising eight data bits, transmitted by any master station 40c,d requesting control of the bus. For this purpose, eight clock pulses are generated on both clock signal conductors (or at least on the first clock signal conductors SCLk is high in case that clock signal conductor is connected to all stations 40a–f). To generate these clockpulses the stations use the wired logic operation of the bus: the station do not use active pull-up, This allows any station to delay the clockpulses in order to have enough time to handle the data.

Each master station (e.g. 40c,d) which has transmitted a start condition and still participates in arbitration pulls down the clock signal conductors SCLk, SCLm so as to generate the clock pulses. Each such master (e.g. 40c,d) puts the bits of its code sequentially on the datasignal conductor SDA by selecting to provide either a low or high impedance path between the datasignal conductor SDA, according to its code, during the time intervals that the clock signal conductors are pulled low. Any master station that does not provide a low impedance path and yet detects that the datasignal conductor SDA is pulled low concludes that it has lost arbitration and ceases to transmit clock pulses and data until it detects a stop condition.

At least one master station (e.g. 40*c,d*) is capable of transferring information at high clock speed (e.g. 4 Mbit per second). The codes of the master stations (e.g. 40*c,d*) are chosen so that the own codes of that master station or those master stations are unique so that any such master can be sure that it has won arbitration if it has not ceased transmitting its code as data after the eighth bit.

A master station (e.g. 40*c,d*) capable of transferring information at high clock speed can switch to high clock speed if it has won arbitration and if it wants to transfer information to a slave station (40*a–f*) which is also capable of transferring information at high clock speed. In this case, the master station (e.g. 40*c,d*) switches to a high speed mode at a time tm. In the high speed mode the master station (e.g. 40*c,d*) transmits clock pulses at high speed via the second clock signal conductor SCLm, but not via the first clock signal conductor SCLk. In the high speed mode the master station (e.g. 40*c,d*) keeps the potential of the first clock signal conductor SCLk at low level, i.e. at the level indicating that no valid data is present on the datasignal conductor SDA.

In the embodiment of FIG. 5, transmission in the high speed mode begins with a renewed start condition, implemented as a level transition of the potential of the data signal conductor SDA when the potential of the second clock signal conductor SCLm is high. The renewed start condition is followed by transmission of a slave address of a slave station (e.g. 40*e,f*) generated by the master station by producing clock pulses on the second clock signal conductor SCLm, and supplying successive bits of the slave address during the high level of successive clock pulses. The slave stations (e.g. 40*e,f*) capable of transferring information at high speed monitor the transmitted address and a slave which detects its own address starts participating in information transfer. Transfer may be from the master station (e.g. 40*c,d*) to the slave station (e.g. 40*e,f*) or vice versa, as defined in the I2C specification, except that only the second clock signal conductor SCLm is used, which can be driven in push-pull.

When the master station (e.g. 40*c,d*) is finished it switches from the high speed mode (at time tk) and signals the end of the message by means of a stop condition 56. The stop condition 56 involves a level transition on the datasignal conductor SDA when the potential of both clock signal conductors SCLm, SCLk is high, i.e. at the level ordinarily indicating valid data (in case all stations 40*a–f* are connected to the first clock signal conductor SCLk a high level on that clock signal conductor suffices). The level transition on the datasignal conductor during the stop condition is opposite to that during the start condition 50.

All stations 40*a–f* detect the stop condition 56. Thereafter master stations 40*a–f* are free to attempt to gain control of the bus again, and slave stations 40*a–f* monitor the bus for new messages to detect whether they are addressed to be involved in information transfer.

When a master station 40*a–f* has gained control of the bus, it may also choose to transfer information at low clock speed (e.g. less than 1 Mhz, for example 100 to 400 kbit per second), for example because the slave station involved in information transfer is only capable of transferring information at low speed and not at high speed (e.g. more than 1 MHz, for example 4 Mbit per second), or because the master itself is only capable of low speed. In that case the master station 40*a–f* uses the first clock signal conductor SCLk to pass clock pulses that define the slave address and any information to be transferred, basically as specified for I2C.

Between the initial start condition 50 and the stop condition 56 the master station 40*a–f* that has gained control of the bus may generate any number of additional start conditions followed by transmission of a slave station address and information transfer, without having to participate anew in arbitration for control of the bus. Depending on whether the information transfer following an additional start condition is to be at low speed or at high speed, the potential of the first clock signal conductor SCLk or of the second clock signal conductor SCLm is kept high level during an additional start condition. Thus any combination of high speed and low speed transfers may be used in one message.

Stations 40*a–f* monitoring only one clock signal conductor SCLk or SCLm will not recognize addressing and information transfer involving the clock signal conductor SCLk or SCLm that they do not monitor. Such stations keep waiting for a relevant address, or information until they receive a stop condition 56.

When more than two different clock speeds are to be used, with stations that are capable of transferring information only at the slowest speed, or only at the slowest and the middle speed, or at more speeds, one may in principle use a correspondingly greater number of clock signal conductors, each for a particular speed, the initial start condition, any arbitration and the stop condition involving only the slowest speed.

It will be noted from FIG. 4 that master stations (e.g. 40*c,d*) that are capable of higher speed information transfer have connections to all of the clock signal conductors, in order to be able to signal start of message to all stations 40*a*–f, to arbitrate and to be able to transfer information with all other stations 40*a–f*. Stations 40*c,d* capable only of slow speed information transfer are connected only to the first clock signal conductor SCLk. These stations may include master stations, which are then only able to transfer information at low speed. Slave stations 40*a,b* that are capable of high speed information transfer, that do not need to contend for control of the bus, and that need to communicate only with master stations capable of high speed information transfer need to be connected to the second clock signal conductor SCLm only.

Figure 6:
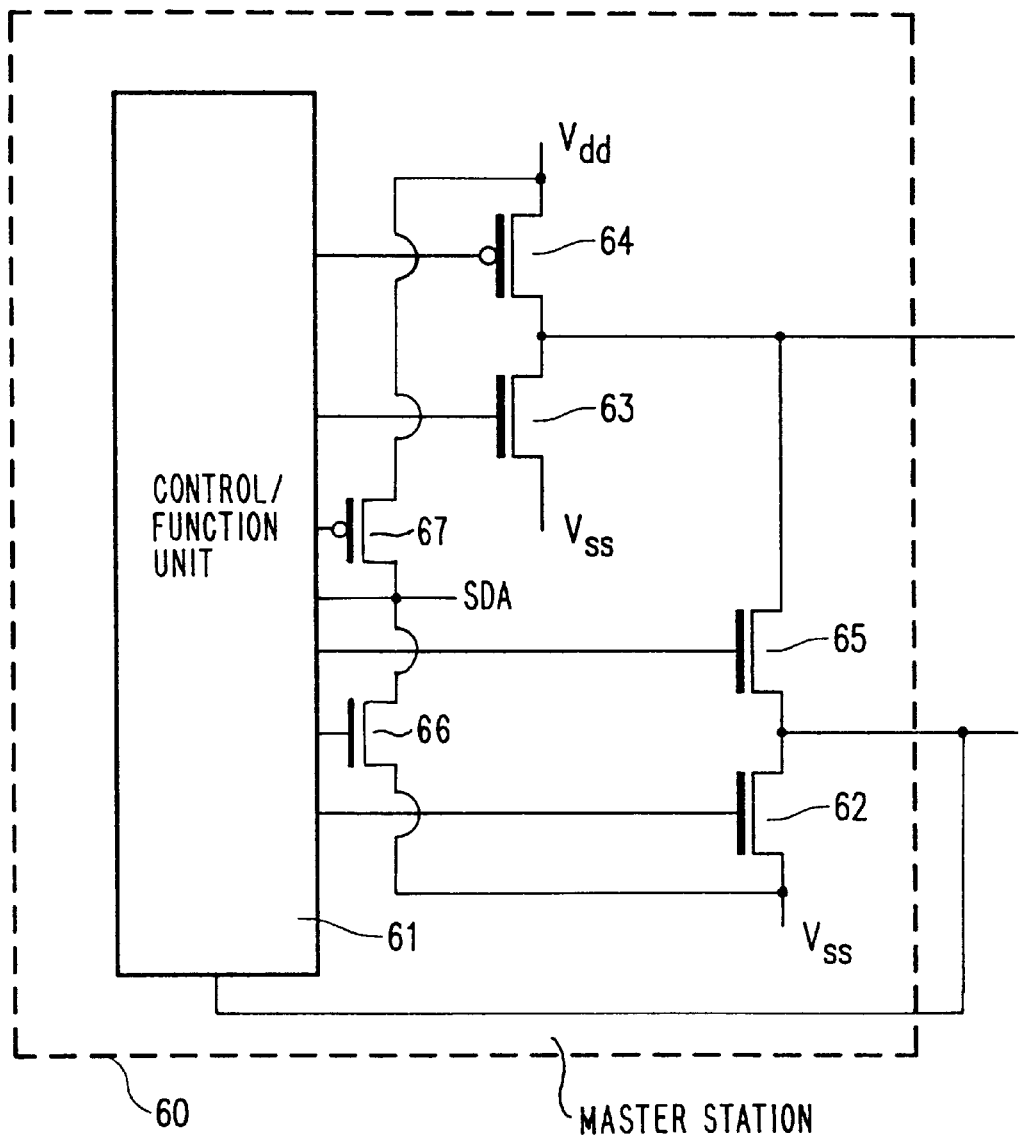
FIG. 6 shows an embodiment of a master station.

FIG. 6 shows an embodiment of a master station 60 with an interface to the bus SDA SCLm, SCLk. The master station 60 contains a control/function unit 61. The master station 60 furthermore contains a first push-pull stage comprising a PMOS transistor 67 and an NMOS transistor 66 having their channels coupled in series between two power supply connections (Vdd and Vss). The control/function unit 61 has a coupling to each of the gates of the PMOS transistor 67 and NMOS transistor 66. A node between the PMOS transistor 67 and the NMOS transistor 66 is coupled to the datasignal conductor SDA and to an input of the control/function unit 61.

The master station 60 furthermore contains a second push-pull stage comprising a PMOS transistor 64 and an NMOS transistor 63 having their channels coupled in series between two power supply connections. The control/function unit 60 has a coupling to each of the gates of the PMOS transistor 64 and NMOS transistor 63. A node between the PMOS transistor 64 and the NMOS transistor 63 is coupled to the second clock signal conductor SCLm for high speed clocking and to the control/function unit 61.

The master station 60 contains a pull-down NMOS transistor 62 with a channel coupled between one of the power supply connections (Vss) and the first clock signal conductor (SCLk) for low speed clocking. The control/function unit 61 has an output coupled to the gate of the pull-down NMOS transistor 62. The first clock signal conductor is coupled to an input of the control/function unit 61.

The master station 60 contains an NMOS pass transistor 65 having a channel coupled between the first clock signal conductor SCLk and the second clock signal conductor SCLm. A gate of the pass transistor 65 is coupled to the control/function unit 61.

In operation the control/function unit 61 monitors the bus SDA, SCLm, SCLk to detect whether a message is being sent or whether it is allowed to attempt to gain control of the bus SDA, SCLm, SCLk. If the master station 60 wants to send a message and it is allowed to gain control of the bus SDA, SCLm, SCLk, it signals a start condition by making the NMOS transistor 66 in the first push-pull stage conductive to pull down the potential of the datasignal conductor SDA. The PMOS transistor 67 in the first push-pull stage is kept non-conductive. The transistors 63, 64 in the second push-pull stage are kept non-conductive and the pull down transistor 62 is kept non-conductive, so that the potential on the clock signal conductors SCLk, SCLm may be kept high by pull-up resistors coupled to these conductors SCLk, SCLm. The control/function unit 61 may keep the pass transistor 65 conductive. Subsequently, during arbitration the control/function unit 61 uses the NMOS transistor 63 in the second push-pull stage and the pull-down transistor 62 to generate clock pulses on both clock signal conductors SCLm, SCLk. The NMOS transistor 66 of the first push-pull stage is used to put the code of the master station 60 on the datasignal conductor SDA. The PMOS transistors 64, 67 in the first and the second push-pull transistors are kept unconductive at this time.

During arbitration the control/function unit 61 monitors the bus SDA SCLk, SCLm to detect whether the master station 60 has gained control of the bus. When that has happened and the master station needs to transfer information over the bus with a high speed clock, the function/control unit 61 makes the pass transistor 62 unconductive and it makes the pull down transistor 62 unconductive.

The control/function unit then starts sending clock pulses via the second clock signal conductor SCLm, using both the NMOS transistor 63 and the PMOS transistor 64 of the second push pull stages. Use of both transistors 63, 64 makes it possible to generate shorter clock pulses than would be possible using only the NMOS transistor 63 and a pull-up resistor. Function/control unit 61 preferably supply a control voltage to the gate of PMOS transistor 64 that is adapted to cause that transistor to supply a predetermined current. This may be realized for example by incorporating PMOS transistor 64 as output in a current mirror (not shown) which receives a reference current. Function/control unit 61 may keep PMOS transistor 64 on permanently during the high speed mode (with the optional exception of time intervals for acknowledge bits), "permanently", that is both when the potential of the clocksignal conductor SCLm is pulled toward Vss and when it is allowed to be pulled to Vdd. Alternatively, function/control unit 61 may switch on PMOS transistor 64 each time when it switches-off NMOS transistor 63 during the high speed mode. Use of the PMOS transistor 64 is allowed because the master station 60 knows for certain that no other station will pull down the potential of the second clock signal conductor SCLm once the master station has finished the arbitration period. When the master transmits information to the slave, bits are written to the datasignal conductor SDA using both transistors 66, 67 of the first push-pull stage. This is allowed for the same reason as use of the second push-pull stage is allowed, and also makes transmission faster. When the slave station transmits information to the master station the slave station may use a similar push-pull stage as the master station.

The frequency of potential changes on the datasignal conductor needs to be only half that on the clock signal conductor. Therefore it is more important for maximum speed that the master uses push-pull to drive the clock signal conductor SCLm than that push-pull is used to drive the datasignal conductor. Because the clock signal conductors are separated at high speed the capacitive load of the clock output of the master station is reduced and the speed of the clock signal may be high. A similar reduction of the capacitive load of the datasignal conductor SDA is not needed because the signal on the datasignal conductor SDA changes more slowly, the datasignal conductor can therefore be kept unsplit.

However, in order to reduce the risk of errors by slow stations due to high frequency transitions on the datasignal conductor, one may also split the datasignal conductor SDA in two sections, one section connected to the stations that are only connected to the one clocksignal conductor SCLk and the other section connected to the other stations. Between the two sections includes a bridge station which connects or isolates the two sections, depending on whether the bridge station detects from the arbitration that high speed transmission will occur.

After every eight bits the receiving station is allowed to acknowledge reception of those bits. For this purpose the master station each time puts a ninth clock pulse on the second clock signal conductor SCLm. The receiving station acknowledges by keeping the potential on the datasignal conductor SDA low during the ninth clock pulse. In an embodiment, the master station 60 may allow for the slower speed pull-up of the datasignal conductor SDA if no acknowledge is given, in this case the master station 60 makes the pre-acknowledge time interval between the eight and the ninth clock pulse longer than the time intervals between the other clock pulses. This pre-acknowledge time interval is preferably at least twice as large as the other time intervals, which can easily be realized by skipping a clock pulse between the eighth clock pulses and the ninth clock pulse.

A master station as shown in FIG. 6 may also be used in an apparatuses with only stations capable only of low speed transmission or only stations capable of high speed transmission, in those case the first clock signal conductor SCLk or the second clock signal conductor SCLk, respectively will generally be omitted from the apparatus.

I claim:

1. An electronic apparatus containing a bus conductor;

a load circuit connected to the bus conductor for pulling a potential of the bus conductor towards a quiescent level;

stations interconnected by the bus conductor, at least one of the stations comprising a wired logic drive circuit coupled to the bus conductor; and an arbitration circuit connected to the wired logic drive circuit for executing an arbitration wherein the wired logic drive circuits of different ones of the stations may each pull the potential against the load circuit; the electronic apparatus comprising a detector for producing a detection signal when at least one of the stations wins the arbitration, for switching the load circuit to an increased current supply capability state in response to said detection signal, the load circuit in the increased current supply capability state supplying a greater current to the bus conductor than during arbitration at least at times when the potential of the bus conductor starts changing towards the quiescent level in the absence of pulling by at least one of the stations against the load circuit.

2. An electronic apparatus according to claim 1, wherein the electronic apparatus selectively switches the load circuit to the increased current supply capability state upon said detection dependent on whether or not the station that wins arbitration is a station that signals during arbitration an intention of driving the potential of the bus conductor against the load circuit with increased current supply capability.

3. An electronic apparatus according to claim 2, wherein particular stations which are capable of a) participating in arbitration and b) driving the potential of the bus signal conductor against the load circuit in the increased current supply capability state each comprise a respective own switchable load circuit for supplying a current increase to the bus conductor, only a winning station of the particular stations activating its own switchable load circuit upon detection that the winning station has won arbitration.

4. An electronic apparatus according to claim 3, wherein the load circuit in the increased current supply state supplies a greater current to the bus conductor than during arbitration at least at times when the potential starts changing towards the quiescent level in the absence of pulling against the load circuit and at times when the bus conductor is pulled against the load circuit.

5. An electronic apparatus according to claim 2, wherein the winning station switches off its switchable load circuit each time when the winning station pulls the bus conductor against the load circuit.

6. An electronic apparatus according to claim 5 the winning station being arranged to switch-on the switchable load circuit a predetermined number of successive bit periods during a data-transfer mode, the winning station being arranged for generating a clock stretch interval in the data transfer mode during at least one bit period after said predetermined number of bit periods, the winning station switching off its switchable current source during the clock stretch interval, the winning station being arranged to terminate the clock stretch interval and to re-enable the switchable current source after the potential of the bus conductor has been allowed to change towards the quiescent level in the clock stretch interval by consent of all stations, the station switching on the switchable current source for further bit periods after the clock stretch interval before switching off the switchable current source for arbitration.

7. An electronic apparatus according to claim 6, characterized in that the winning station is arranged to include said stretch intervals periodically in the data transfer mode.

8. An electronic apparatus according to claim 5 or 6, wherein a transmitting one of the stations supplies data using the datasignal on a further bus conductor for a first part of the predetermined number of bit periods, the transmitting one of the stations releasing control over the datasignal conductor for at least one acknowledge bit period following said first part and preceding the wired logic transition of the clocksignal allowed by consent of all stations, the transmitting one of the stations monitoring the further bus conductor for an acknowledge signal during said at least one acknowledge bit period, the transmitting one of the stations resuming driving of said datasignal with a subsequent bit after said at least one bit acknowledge period, the subsequent bit being validated by the wired logic transition of the clocksignal allowed by consent of all stations.

9. An electronic apparatus according to claim 1, the electronic apparatus comprising a further bus conductor, data being transferred to or from the at least one station via the further bus conductor in synchronism with clock signals on the bus conductor, the at least one of the stations driving the potential of the bus conductor against the load circuit in the increased current supply capability state both in case of transmission from and to the at least one of the stations in case the at least one of the station has won arbitration.

10. An electronic apparatus according to claim 9, comprising a further load circuit which contains all substantial current paths for pulling the further bus conductor towards the quiescent level, maximum possible currents supplied by the further load circuit always being substantially equal at corresponding instants, both during arbitration and data transmission also when the load circuit is in the increased current supply capability state.

11. An electronic apparatus according to claim 1, wherein the electronic apparatus selectively switches the load circuit to the increased current supply capability state upon said detection dependent on whether or not the station that wins arbitration a) is a station capable of driving a potential of the bus conductor against the load circuit with increased current supply capability and
   b) indicates a mode in which it wants to exchange data with a further one of the stations which is capable of driving the potential on the bus conductor against the load circuit in the increased current supply capability state.

12. An integrated circuit arranged for operating as a station in an electronic apparatus containing stations interconnected by a bus conductor, the integrated circuit comprising a connection for the bus conductor;
   a switchable load circuit connected to the connection for the bus conductor;
   a wired logic drive circuit coupled to the connection for the bus conductor;
   an arbitration circuit connected to the wired logic drive circuit for executing a wired logic arbitration using the bus conductor; and
   a detector for producing a detection signal when at least one of the stations wins the arbitration, for switching the load circuit to an increased current supply capability state in response to said detection signal, the load circuit in the increased current supply capability state supplying a greater current to the bus conductor than during arbitration at least at times when a potential of the bus conductor starts changing towards the quiescent level in the absence of pulling by at least one of the stations against the load circuit.

13. An integrated circuit according to claim 12, wherein the station switches off the switchable load circuit each time when the station pulls the bus conductor against the load circuit.

14. An integrated circuit according to claim 12, arranged to switch on the switchable load circuit a predetermined number of successive bit periods during a data-transfer mode, the integrated circuit being arranged for generating a clock stretch interval in the data transfer mode during at least one bit period after said predetermined number of bit periods, the integrated circuit switching off its switchable current source during the clock stretch interval, the integrated circuit being arranged to terminate the clock stretch interval and to re-enable the switchable current source after the potential of the bus conductor has been allowed to change towards the quiescent level in the clock stretch interval by consent of all stations, the station switching on the switchable current source for further bit periods after the clock stretch interval before switching off the switchable current source for arbitration.

15. An integrated circuit according to claim 14, wherein the load circuit in the increased current supply state supplies a greater current to the bus conductor than during arbitration at least at times when the potential starts changing towards the quiescent level in the absence of pulling against the load circuit and at times when the bus conductor is pulled against the load circuit.

16. Integrated circuit according to claim 12, comprising a connection for a further bus conductor, for transfer to or from the integrated circuit via the further bus conductor in synchronism with clock signals on the bus conductor, the wired logic drive circuit driving the potential of bus conductor against the load circuit in the increased current supply capability state both in case of transmission from and to the integrated circuit in case the integrated circuit has won arbitration.

17. An integrated circuit according to claim 16, the integrated circuit driving the further bus conductor by wired logic drive only.

* * * * *